United States Patent
Baasch

(10) Patent No.: US 9,959,760 B2
(45) Date of Patent: May 1, 2018

(54) PARKING ASSISTANT

(71) Applicant: ZF Friedrichshafen AG, Friedrichshafen (DE)

(72) Inventor: Detlef Baasch, Oberteuringen (DE)

(73) Assignee: ZF FRIEDRICHSHAFEN AG, Friedrichshafen (DE)

(*) Notice: Subject to any disclaimer, the term of this patent is extended or adjusted under 35 U.S.C. 154(b) by 0 days. days.

(21) Appl. No.: 15/224,603

(22) Filed: Jul. 31, 2016

(65) Prior Publication Data
US 2017/0032674 A1 Feb. 2, 2017

(30) Foreign Application Priority Data

Jul. 31, 2015 (DE) .................. 10 2015 214 610

(51) Int. Cl.
G08G 1/14 (2006.01)
G08G 1/16 (2006.01)
G05D 1/02 (2006.01)

(52) U.S. Cl.
CPC .......... *G08G 1/141* (2013.01); *G05D 1/0276* (2013.01); *G08G 1/168* (2013.01)

(58) Field of Classification Search
CPC ....... G08G 1/141; G08G 1/168; G05D 1/0276
USPC ........................................................ 701/23
See application file for complete search history.

(56) References Cited

U.S. PATENT DOCUMENTS

| 9,168,955 | B2 | 10/2015 | Noh et al. |
| 2014/0371972 | A1 | 12/2014 | Jecker et al. |
| 2015/0032323 | A1 | 1/2015 | Nijakowski et al. |
| 2015/0149265 | A1* | 5/2015 | Huntzicker ........... B60W 30/06 705/13 |
| 2015/0345965 | A1 | 12/2015 | Semsey |
| 2016/0107691 | A1 | 4/2016 | Goldmann |

FOREIGN PATENT DOCUMENTS

| DE | 102011122191 A1 | 6/2012 |
| DE | 102011112149 A1 | 3/2013 |
| DE | 102012201495 A1 | 8/2013 |
| DE | 102012202175 A1 | 8/2013 |
| DE | 102012005302 A1 | 9/2013 |
| DE | 102012224149 A1 | 6/2014 |
| DE | 102013212318 A1 | 12/2014 |
| WO | WO 2016/083077 A1 | 6/2016 |

OTHER PUBLICATIONS

German Search Report DE102015214610.3, dated Jul. 21, 2016. (9 pages).

* cited by examiner

*Primary Examiner* — Brian P Sweeney
(74) *Attorney, Agent, or Firm* — Dority & Manning, P.A.

(57) ABSTRACT

A method for finding a parking space for a first motor vehicle includes determining a required minimum length of the parking space on which the first motor vehicle is parkable, scanning a length of the adjacent parking space through the second motor vehicle, and driving the first motor vehicle to the adjacent parking space bounded by the second motor vehicle when the length of the adjacent parking space corresponds to at least the minimum length. Related transmission devices and control systems are also provided.

9 Claims, 2 Drawing Sheets

PARKING ASSISTANT

FIELD OF THE INVENTION

The invention relates generally to a parking assist system. More particularly, the invention relates to a technique for finding a suitable parking space for a motor vehicle.

BACKGROUND

Along a street, parking lanes are provided, on which motor vehicles may be parked in succession. If individual parking spaces are marked, an area of pre-defined length is available for each motor vehicle. This is typically measured in such a manner that an average motor vehicle is able to park in the parking space. If the parking spaces are not individually marked, gaps of various lengths may arise between the parked motor vehicles. For a newly incoming motor vehicle, prior to a parking operation, it is typical that there must be a check of whether the length of such a parking space is sufficient or not for parking the motor vehicle. Therefore, finding a parking space for the motor vehicle that is long enough may take a long time, and traffic on the street may be hindered by the motor vehicle.

DE 10 2011 112 149 A1 relates to a parking operation of a motor vehicle in a parking space that is carried out at least semi-autonomously. DE 10 2012 201 495 A1 proposes deciding, on the basis of determinations of two or three dimensions, whether or not a motor vehicle fits into a parking space. DE 10 2012 202 175 A1 relates to a control device for automatically parking a motor vehicle. Each of DE 10 2013 212 318 A1 and DE 10 2013 005 302 A1 relates to methods for carrying out an automated parking operation of a motor vehicle in a parking space.

SUMMARY OF THE INVENTION

Exemplary aspects of the invention simplify the finding a parking space between two motor vehicles, whereas the length of the parking space is sufficient for enabling the parking a third motor vehicle.

A method for finding a parking space for a first motor vehicle, whereas the parking space is bounded on one side by a second motor vehicle, includes determining a required minimum length of a parking space on which the first motor vehicle is able to park, of scanning, through the second motor vehicle, a length of the adjacent parking space; and of driving the first motor vehicle to the parking space bounded by the second motor vehicle, if the length of such parking space corresponds to at least the minimum length.

The length of the parking space can be determined by the second motor vehicle by a sensor that may already be installed in the second motor vehicle for another purpose. For example, the sensor may include an ultrasonic range finder, a radar range finder or Lidar range finder or a camera. Thereby, the dimensions of the parking space adjacent to the second motor vehicle can be determined easily and securely. The free parking space may be adjacent to the front and/or rear of the second motor vehicle, and the second motor vehicle may be equipped in the rear or front with sensors for scanning the dimensions of the parking space. The first motor vehicle may, based on the information of the second motor vehicle, easily obtain an indication as to whether or not the parking space at the second motor vehicle is sufficiently large, or a signal that is sufficiently large for driving the first motor vehicle to a different parking space. Searching for a parking space for the first motor vehicle may take less time. In doing so, flowing traffic may be subject to a lower disruption.

It is particularly preferred that the lengths and positions of a multiple number of parking spaces that are each bounded by a second motor vehicle are collected, that those parking spaces, the lengths of which correspond to at least the specified minimum length, are selected, and that the first motor vehicle is guided to one of the selected parking spaces. The benefits of the method may be even greater, the more second motor vehicles participate in the process.

Preferably, among the selected parking spaces, a further sub-selection is made, in order to enable a parking of the first vehicle that is as economical as possible, from both its point of view and from a higher-level system view. For this purpose, different selection strategies may be pursued; these may also be combined with one another.

In one variant, the parking space to which the first motor vehicle is guided is determined on the basis of a current position of the first motor vehicle. The first motor vehicle may be guided, for example, to the nearest parking space. In doing so, for example, the traffic lane driven on by the first motor vehicle or the direction of travel that it is using may be taken into account. Thus, complicated or complex maneuvers may be spared, such that flowing traffic can be less impaired by the search for a parking space of the first motor vehicle.

In a second variant, the parking space to which the first motor vehicle is guided is determined in such a manner that the length of the parking space exceeds the minimum length as little as possible. This may prevent, for example, a large parking space from being occupied by a small first motor vehicle, by which, under certain circumstances, a further, larger first motor vehicle cannot find a suitable parking space or one that is nearby. Thereby, the general parking efficiency may be increased.

In an additional embodiment, the second motor vehicle, which bounds the parking space to which the first motor vehicle is to be guided, emits an indication at the parking space directly to the first motor vehicle. The indication is given particularly wirelessly, for example, optically, acoustically or electromagnetically. Thereby, infrastructure located between the motor vehicles may be spared.

In addition, means of signaling that are already arranged on board the second motor vehicle may be used. It is particularly preferred that the indication is issued to the parking space by a rear light, a brake light, a reverse light, a flashing light, a parking light or a rear fog light that is mounted on the outside of the second motor vehicle. Thereby, a signaling that is silent and energy-saving and possibly reaches several hundred meters may be transmitted directly from the second motor vehicle to the first motor vehicle. The disturbance of persons in the area of motor vehicles can be minimized. For different indications, different signals can be emitted by one or more of the specified lights. Thereby, on an ad hoc basis, a similar system can be constructed, as this is known from parking garages where free parking spaces are indicated by lights mounted on the parking spaces.

A computer program product includes program code for carrying out the described method, if the computer program product is run on a processing device or stored on a computer-readable data carrier.

A device for a first motor vehicle is configured for the wireless transmission of a parking space request. Thereby, the parking space request includes an indication for a minimum length of a parking space on which the first motor vehicle is able to park. The minimum length can be determined in particular from the motor vehicle length, the motor vehicle width and/or a minimum turning radius of the motor vehicle. The minimum length can be determined empirically or by calculation. In one embodiment, the minimum length may also include a security or convenience distance that increases the geometrically required minimum length. Typically, the minimum length is determined only once, such that the device can be simply constructed. In particular, the device may be connected to a communication system that is already provided on board the first motor vehicle, for example, for cell phone or Internet data.

A device for a second motor vehicle includes a receiver for receiving a parking space request, which includes a minimum length of a parking space, on which a first motor vehicle is able to park, a sensor for scanning the length of a parking space adjacent to the second motor vehicle and a signaling device in order to lead the first motor vehicle to the parking space, if the length of the parking space corresponds to at least the minimum length. The device may in particular make use of a distance meter already installed on board the second motor vehicle, with which the length of the parking space can be determined. The signaling device may also be connected to an information or communication system of the second motor vehicle.

In various embodiments, the devices of the first and second motor vehicles can communicate with each other directly or with an interposed control device that is configured in particular to determine first motor vehicles and parking spaces that are suitable for one another.

A control device includes a first receiving device for receiving a parking space request of a first motor vehicle, whereas the parking space request includes a position of the first motor vehicle and a minimum length of a parking space on which the first motor vehicle is able to park, a second receiving device for receiving a position and a length of a parking space that is bounded by a second motor vehicle, and a transmitting device for transmitting a signal in order to lead the first motor vehicle to the parking space bounded by the second motor vehicle, if the length of the parking space corresponds to at least the minimum length.

Furthermore, in particular, a memory device may be provided in order to store, in particular, positions and lengths of a multiple number of parking spaces.

BRIEF DESCRIPTION OF THE DRAWINGS

Exemplary aspects of the invention will now be described in detail with reference to the accompanying figures, in which.

DETAILED DESCRIPTION

Figure 1:
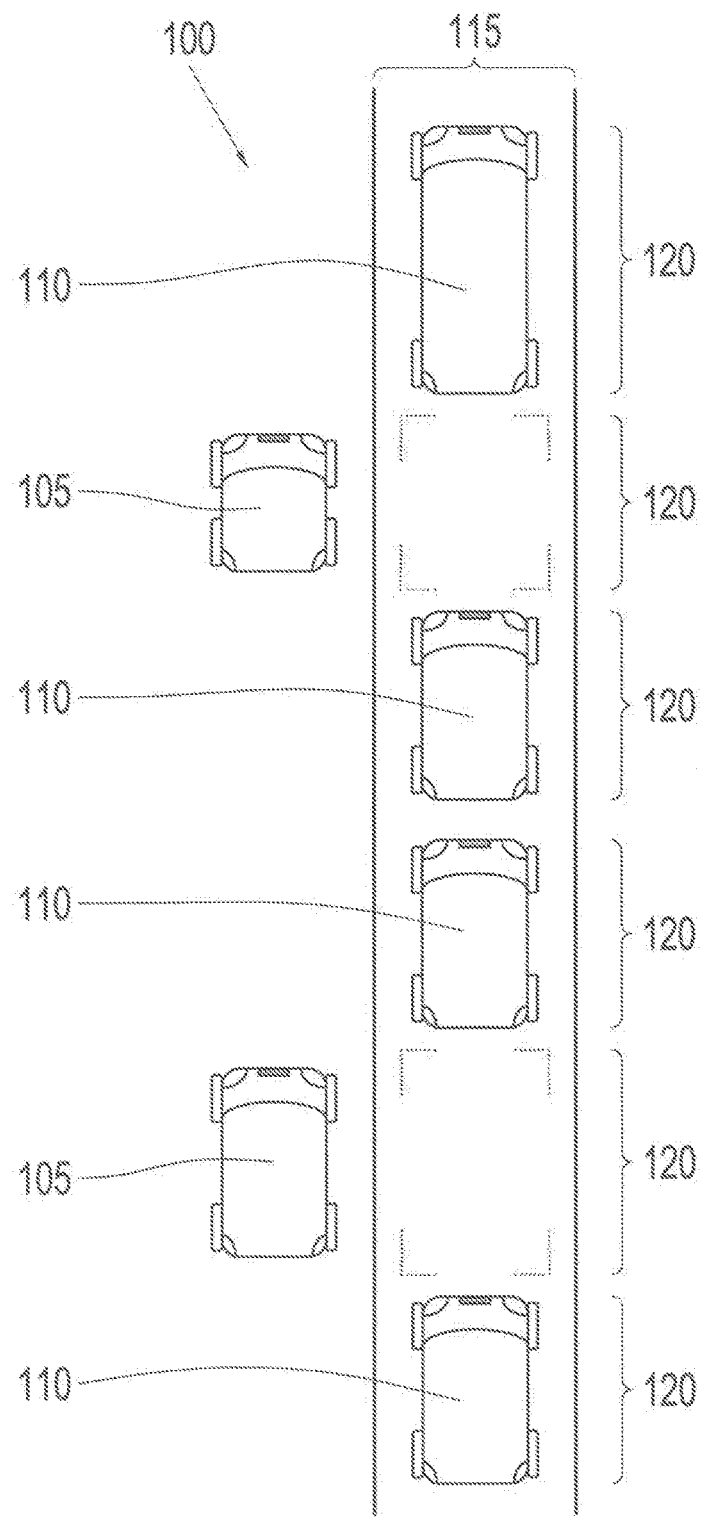
FIG. 1 a parking situation with two first and a multiple number of second number motor vehicles.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a parking situation 100 with two first motor vehicles 105 and a multiple number of second motor vehicles 110. Motor vehicles 105, 110 may be parked on a parking lane 115. The parking lane 115 may be formed in particular along a street. Preferably, on the parking lane 115, there is no specification of the length limitations for individual parking spaces 120 that are configured for parking a motor vehicle 105, 110. In general, the length of a parking space 120 is bounded by the length of a second motor vehicle 110 parked in the parking space 120, if the parking space 120 occupied. Typically, a free parking space 120 has a length that is defined between a parked second motor vehicle 110 and a boundary or an additional parked second motor vehicle 110.

On the parking lane 115, a multiple number of second motor vehicles 110 are parked, by which a multiple number of free parking spaces 120 and a multiple number of occupied parking spaces 120 arise. Next to the parking lane 115, two exemplary first motor vehicles 105 are shown, each of which is searching for a parking space 120 that is sufficiently large to park the respective first motor vehicle 105 on it. In this present example, a small first motor vehicle 105 (above) and a large first motor vehicle 105 (below) are shown. In each case, next to the first motor vehicle 105, there is a free parking space 120, whereas the size or length of the parking space 120 corresponds to the first motor vehicle 105 that is also shown.

A first goal of the present invention includes providing a first motor vehicle 105 that is searching for a parking space an indication of a free parking space 120 that is sufficiently large or sufficiently long. A second goal of the present invention includes of, as much as possible, distributing a multiple number of first motor vehicles 105 to a multiple number of free parking spaces 120 in such a manner that both small and large first motor vehicles 105 find a parking space 120.

For this purpose, it is proposed that the first motor vehicle 105 determines the size of a parking space 120 on which the first motor vehicle 105 is able to park. In addition, one or more of the parked second motor vehicles 110 determines the size of the free parking spaces 120 adjacent to them. The information of the first motor vehicle 105 and the second motor vehicle 110 are then to be compared with one another, in order to initially determine, for an individual free parking space 120, if the parking space 120 is sufficiently large for a given first motor vehicle 105. Preferably, a multiple number of free parking spaces 120 is determined by second motor vehicles 110, such that one or more parking spaces 120 that are sufficiently large or long for the given first motor vehicle 105 can be selected. It can then be displayed to the first motor vehicle 105 whether or not a parking space 120 that is nearby can be used for the first motor vehicle 105 for parking. Furthermore, the first motor vehicle 105 may be led to one of several potentially free parking spaces 120 that are suitable for parking the first motor vehicle 105.

For this purpose, different embodiments are possible, which will be described below with reference to FIG. 2.

Figure 2:
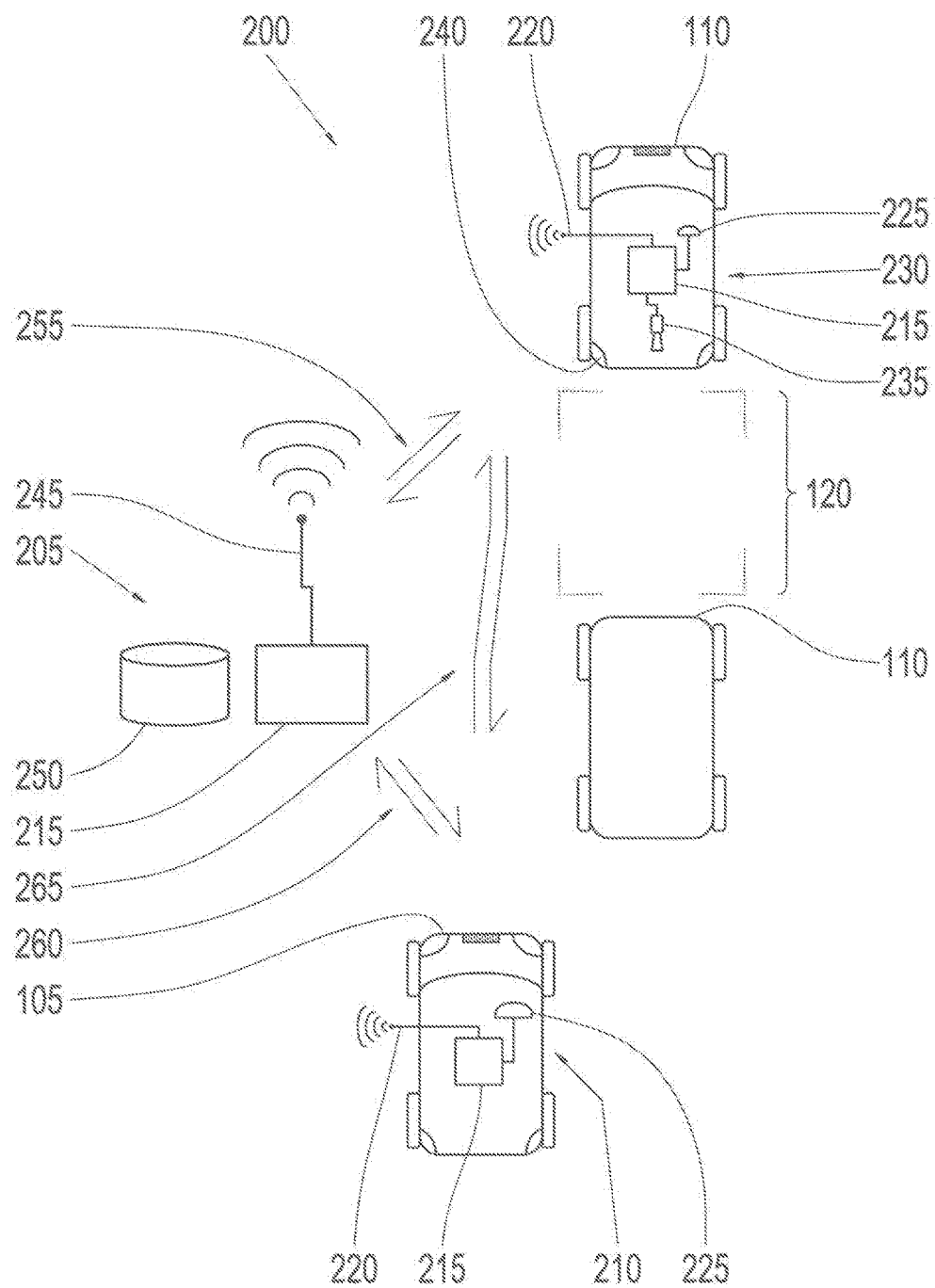
FIG. 2 a system with a first and a second motor vehicle along with a control device are shown.

FIG. 2 shows a system 200 with a first motor vehicle 105 and a second motor vehicle 110 along with a control device 205. In order to better describe the operation of the system 200, the devices installed on board the motor vehicle 105, 110 will be initially briefly addressed.

On board the first motor vehicle 105, a first device 210 is arranged; the first device 210 preferably includes a processing device 215 and a transmitting device 220. The processing device 215 may be connected to a positioning device 225, which is configured to determine a current position of the first motor vehicle 105. The positioning device 225 may in particular include a receiver for position signals of a satellite navigation system (GPS, GLONASS, Galileo, etc.).

For example, in a manner controlled by the drive of the first motor vehicle 105, the first device 210 may transmit a parking space request, which includes a minimum length of a parking space 120, on which the first motor vehicle 105 is able to park. As will be described in greater detail below, the parking space request may include other parameters, in particular the current position of the first motor vehicle 105 determined by the positioning device 225. The transmitting device 220 is preferably designed to be wireless, and may be realized by any known technique.

On board the second motor vehicle 110, a second device 230 is provided, which preferably also includes a processing device 215 and an optional positioning device 225. In addition, the second device 230 is connected to a sensor 235, which is configured to determine the size or length of a free parking space 120, which is bounded by the second motor vehicle 110 and is adjacent to the second motor vehicle 110. There may also be multiple sensors 235, which, in an additional embodiment, point in different directions, particularly forwards and rearwards. Each sensor 235 may include, for example, a camera, an ultrasonic sensor, a radar sensor or a Lidar sensor. Combinations of different sensors 235 are also possible.

The second device 230 is preferably also connected to a transmitting device 220, which may be constructed in accordance with the transmitting device 220 on board the first motor vehicle 105. Alternatively or in addition to transmitting device 220, the processing device 215 of the second device 230 may be connected to a signal transmitter 240 on board the second motor vehicle 110. The signal transmitter 240 may include, in particular, an optical signaling system on board the second motor vehicle 110. In a preferred embodiment, the signaling system includes at least one of a rear light, a brake light, a reverse light, a flashing light, a parking light or a rear fog light. With the signal transmitter 240, the processing device 215 may bring about an optical signal that can be perceived on board the first motor vehicle 105, if the first motor vehicle 105 is located nearby.

The control device 205, which may be included within the system 200, preferably includes an additional processing device 215 and a preferably wireless communication device 245, which is particularly configured to communicate wirelessly with one of the transmitting devices 220. In some embodiments, bidirectional communication, in particular between the control device 205 and the first device 210 on board the first motor vehicle 105, may be supported. In this case, the transmitting device 220 of the first device 210 may also be designed to receive information. The control device 205 may also include a storage device 250, which may serve for the temporary storage of parking space information that has been previously received, in particular from the second motor vehicles 110. Outdated information can be automatically deleted from the storage device 250.

For the description of the system 200, in a first variant thereof, it is assumed that the control device 205 is provided. On board the second motor vehicle 110, with the sensor 235, the second device 230 determines the length of the free parking space 120 and, preferably with the positioning device 225, the position of the second motor vehicle 110. Such information is transmitted in a first communication device 255 to the control device 205, and is optionally stored in the storage device 250. This operation is preferably carried out for a multiple number of second motor vehicles 110, each of which is adjacent to a parking space 120, such that, on the part of the control device 205, information regarding a multiple number of free parking spaces 120 is present.

The first device 210 on board the first motor vehicle 105 emits, in particular in a manner controlled by a driver of the first motor vehicle 105, a parking space request to the control device 205, whereas the parking space request includes the minimum length of a parking space 120 on which the first motor vehicle 105 is able to park. The processing device 215 of the control device 205 then determines, on the basis of the information available to it, one or more free parking spaces 120 in the area of the first motor vehicle 105, and transmits corresponding indications on the first motor vehicle 105. The indications may include in particular the positions of the free parking spaces 120 or the second motor vehicles 110 adjacent to them. On the part of the first motor vehicle 105, one of the parking spaces 120 may then be selected and driven to on the basis of the transmitted information.

The processing device 205 may employ a heuristic to distribute free parking spaces 120 to first motor vehicles 105 searching for parking spaces. In one embodiment, through several parking space placements, the "waste" that arises if a short vehicle 105 is on a long parking space 120 is minimized. The waste may only be taken into account if it is too small to park an additional vehicle on it. Additionally or alternatively, it may be considered that a distance between a desired position of the first motor vehicle 105 and an allocated parking space 120 is minimized where possible or, through their average, a multiple number of allocations is minimized where possible. The desired position may be a planned target position or a current position of the first motor vehicle at the time of communicating with the processing device 105. In place of a distance, an expected driving time of the first motor vehicle 105 can be taken into account, which is dependent on the distance.

In a second variant, the control device 205 is not provided and, in a communication device 265, the motor vehicles 105, 110 exchange information directly (C2C) or through a fixed infrastructure (C2I). Thereby, a processing of information that goes beyond its transport is not carried out on the part of the infrastructure.

For each pair of the first motor vehicle 105 with a second motor vehicle 110 that can be reached with communications technology, there is a decision of whether the free parking space 120 adjacent to the second motor vehicle 110 is sufficiently large for the first motor vehicle 105. Alternatively, such decision may be taken on board the first motor vehicle 105, if the second motor vehicle 110 determines the size of free parking space 120 for the first motor vehicle 105, or on the part of the second motor vehicle 110, if the first motor vehicle 105 transmits its preferred minimum length to the second motor vehicle 110.

In one embodiment, the first motor vehicle 105 transmits the minimum length of a parking space 120 that it can use to a multiple number of second motor vehicles 110 that are parked, in particular, on the same parking lane 115 or along the same street. At that point, each of the second motor vehicles 110 can determine whether the respective adjacent parking space 120 is sufficiently large for the first motor vehicle 105.

In one embodiment, a signaling of whether a parking space 120 is suitable or unsuitable for the first motor vehicle 105 is transmitted by light signals from the second motor vehicle 110 to the first motor vehicle 105. For this purpose, it is preferred that signal lights, which can be mounted in particular on the vehicle rear of the second motor vehicle 110, are accordingly controlled. Different light combinations may be activated, and each light may be switched on and off alternately with a predetermined frequency. In an exemplary embodiment, a free parking space 120 that is too small for the first motor vehicle 105 is signaled by the fact that a brake or tail light of the second motor vehicle 110 lights up red. A parking space 120 that is at least sufficiently large or, if applicable, too large may be signaled by turning on an indicator light on the second motor vehicle 110. A free parking space 120 with a size or length that is optimally suited for the first motor vehicle 105 within a predetermined margin can be signaled by the activation of a white reverse light by the second motor vehicle 110.

Modifications and variations can be made to the embodiments illustrated or described herein without departing from the scope and spirit of the invention as set forth in the appended claims.

REFERENCE SIGNS

100 Parking situation
105 First motor vehicle
110 Second motor vehicle
115 Parking lane
120 Parking space
200 System
205 Control device
210 First device
215 Processing device
220 Transmitting device
225 Positioning device
230 Second device
235 Sensor
240 Signal transmitter
245 Communication device
250 Storage device
255 Communication device
260 Communication device
265 Communication device

The invention claimed is:

1. A method for finding a parking space for a first motor vehicle, the parking space bounded on one side by a second motor vehicle in an adjacent parking space, the method comprising:
   transmitting a parking space request from the first motor vehicle, the parking space request including a minimum length of a parking space on which the first motor vehicle is parkable;
   receiving the parking space request at the second vehicle;
   scanning, through the second motor vehicle, a length of the adjacent parking space; and
   guiding the first motor vehicle to the adjacent parking space bounded by the second motor vehicle when the length of the adjacent parking space corresponds to at least the minimum length, wherein the first motor vehicle is guided by a signaling device, the signaling device being on the first motor vehicle or on the second motor vehicle.

2. The method of claim 1, wherein the parking space for the first motor vehicle is one of a plurality of parking spaces and the second motor vehicle is one of a plurality of second motor vehicles, each parking space of the plurality of parking spaces bounded on one side by one of the plurality of second motor vehicles in a respective adjacent parking space, the method further comprising:
   collecting a position and a length of the respective adjacent parking space for each second motor vehicle of the plurality of second motor vehicles;
   selecting a group of adjacent parking spaces, the length of each adjacent parking space in the group of adjacent parking spaces corresponding to at least the minimum length; and
   guiding the first motor vehicle to one of the group of adjacent parking spaces.

3. The method of claim 2, wherein guiding the first motor vehicle to the one of the group of adjacent parking spaces comprises guiding the first motor vehicle to the one of the group of adjacent parking spaces based on a current position of the first motor vehicle.

4. The method of claim 2, further comprising selecting the one of the group of adjacent parking spaces from the group of adjacent parking spaces prior to guiding the first motor vehicle to the one of the group of adjacent parking spaces, the one of the group of adjacent parking spaces selected from the group of adjacent parking spaces such that a difference between a length of the one of the group of adjacent parking spaces and the minimum length is minimized.

5. The method of claim 1, wherein the second motor vehicle emits an indication directly to the first motor vehicle that the length of the adjacent parking space corresponds to at least the minimum length.

6. The method of claim 5, wherein:
   the second motor vehicle has, at an exterior of the second motor vehicle, at least one of a rear light, a brake light, a reverse light, a flashing light, a parking light or a rear fog light; and
   the second motor vehicle emits the indication with at least one of the rear light, the brake light, the reverse light, the flashing light, the parking light or the rear fog light.

7. A wireless parking space request transmission system, comprising:
   a processing device and a wireless transmitting device on a first vehicle, the processing device operable to transmit a parking space request with the wireless transmitting device, the parking space request including an indication for a minimum length of a parking space on which the first vehicle is parkable;
   a wireless receiver operable to receive a parking space request, the parking space request including a minimum length of a parking space on which a first motor vehicle is parkable, the wireless receiver being on a second motor vehicle;
   a sensor on the second motor vehicle, the second sensor operable to scan a length of an adjacent parking space next to the second motor vehicle; and
   a signaling device operable to lead the first motor vehicle to the adjacent parking space when the length of the adjacent parking space corresponds to at least the minimum length, the signaling device being on the first motor vehicle or on the second motor vehicle.

8. A wireless parking space transmission system, comprising:
   a wireless receiver operable to receive a parking space request, the parking space request including a minimum length of a parking space on which a first motor vehicle is parkable, the wireless receiver being on a second motor vehicle;
   a sensor on the second motor vehicle, the second sensor operable to scan a length of an adjacent parking space next to the second motor vehicle; and a signaling device operable to lead the first motor vehicle to the adjacent parking space when the length of the adjacent parking space corresponds to at least the minimum length, the signaling device being on the first motor vehicle or on the second motor vehicle.

9. A parking control system, comprising:
a first receiving device on a second motor vehicle operable to receive a parking space request of a first motor vehicle, the parking space request including a position of the first motor vehicle and a minimum length of a parking space on which the first motor vehicle is parkable;
a second receiving device on the second motor vehicle operable to receive a position and a length of an adjacent parking space that is bounded by a second motor vehicle; and
a transmitting device on the second motor vehicle operable to transmit a signal to lead the first motor vehicle to the adjacent parking space bounded by the second motor vehicle when the length of the adjacent parking space corresponds to at least the minimum length.

* * * * *